Sept. 13, 1932.    V. G. APPLE ET AL    1,876,544
SERVO BRAKE MECHANISM
Filed March 1, 1930    4 Sheets-Sheet 3

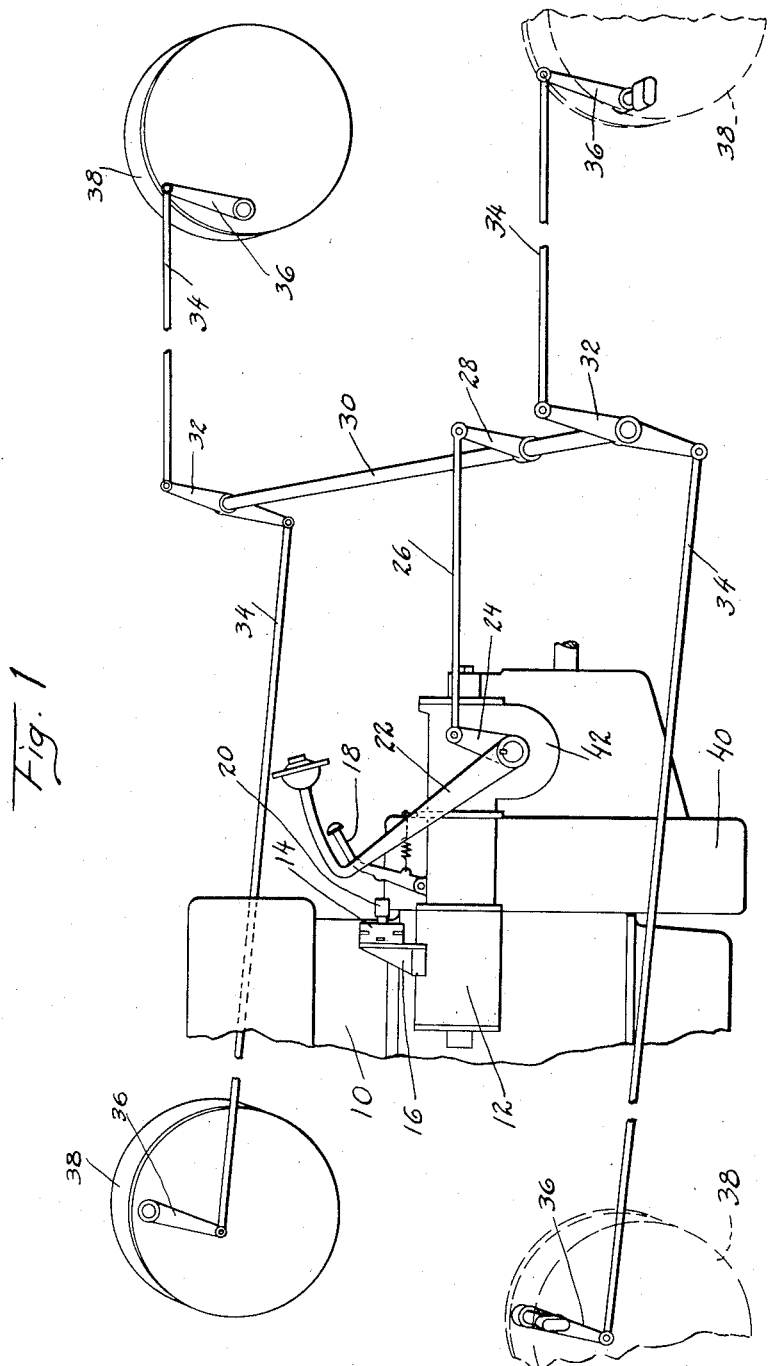

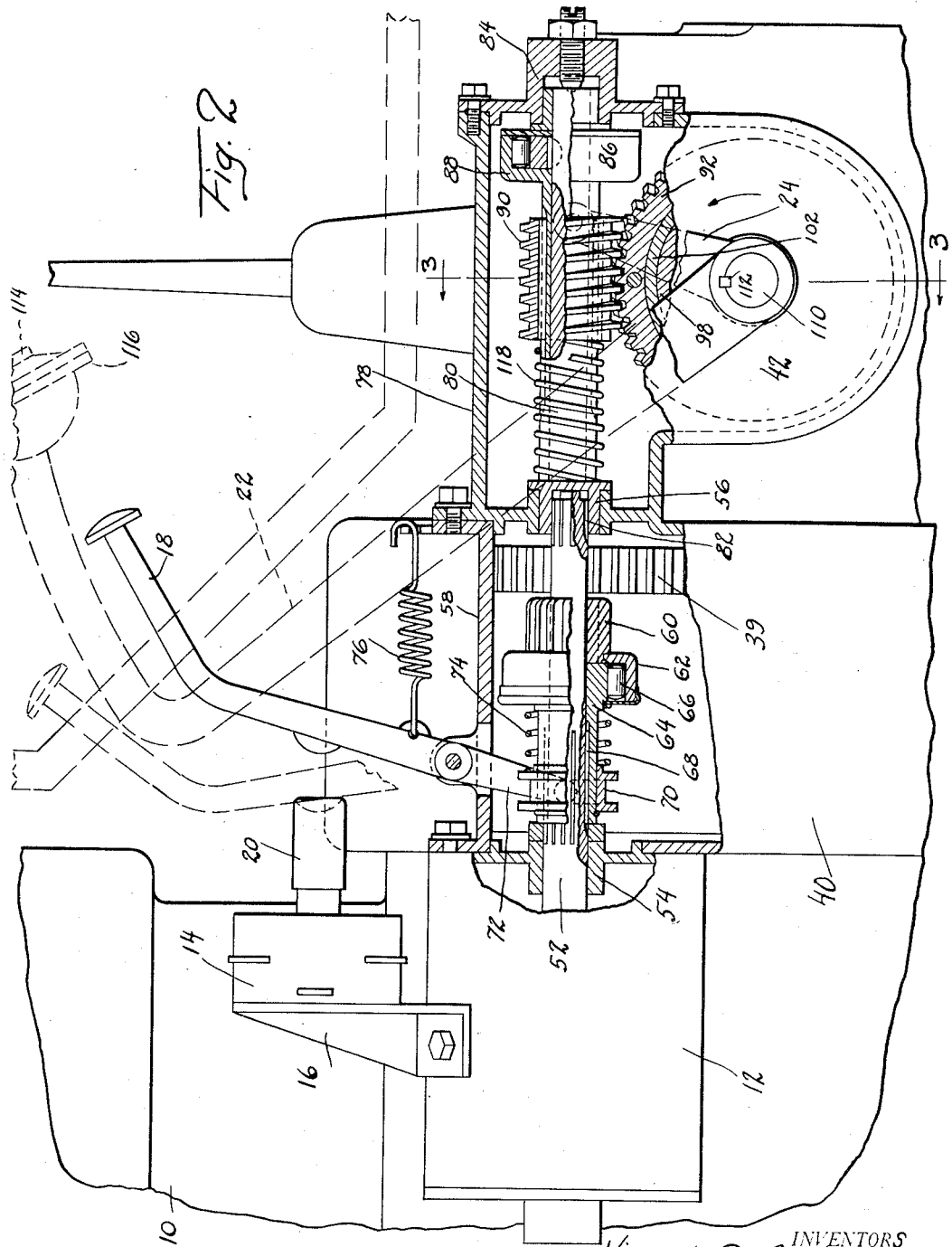

INVENTORS
Vincent G. Apple and
Frederick W. Cotterman
BY
ATTORNEYS

Sept. 13, 1932.  V. G. APPLE ET AL  1,876,544
SERVO BRAKE MECHANISM
Filed March 1, 1930  4 Sheets-Sheet 4
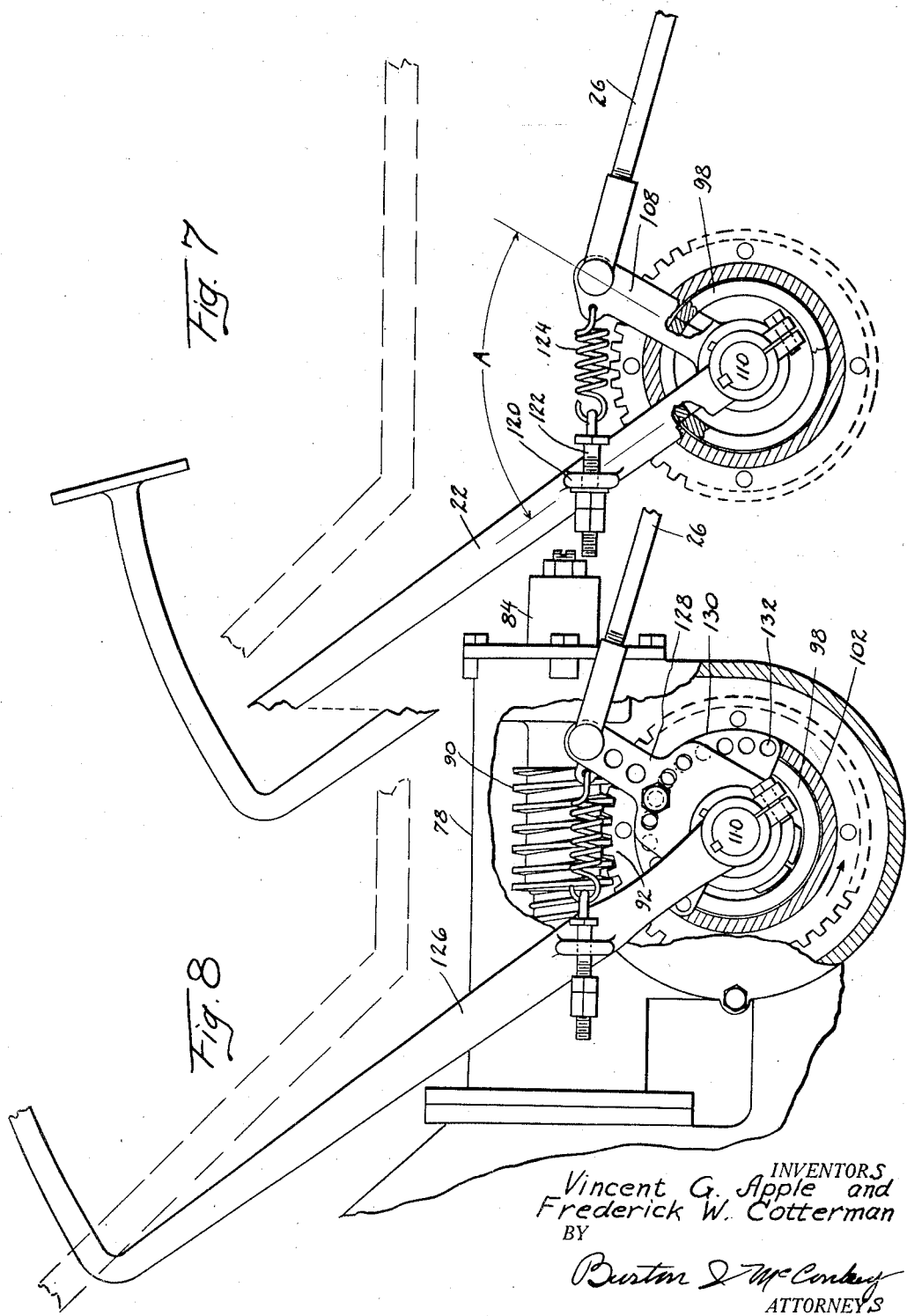
INVENTORS
Vincent G. Apple and
Frederick W. Cotterman
BY
Burton & McConkey
ATTORNEYS Patented Sept. 13, 1932

1,876,544

UNITED STATES PATENT OFFICE

VINCENT G. APPLE AND FREDERICK W. COTTERMAN, OF DAYTON, OHIO, ASSIGNORS TO BENDIX BRAKE COMPANY, OF SOUTH BEND, INDIANA, A CORPORATION OF ILLINOIS

SERVO BRAKE MECHANISM

Application filed March 1, 1930. Serial No. 432,294.

Our invention relates to automotive brake mechanism and has particular reference to an operating system whereby a single power source may be utilized to crank the engine and to provide the power for operating the brakes.

A particular object of the invention is to provide mechanism whereby the power from the electric starting motor may be used optionally either to crank the engine in the usual manner or to operate a servo mechanism to apply the brakes.

Still another object of the invention is to so arrange the connections between the electric starting motor and each of the other mechanisms which it is designed to operate that each is necessarily independent of the other and the possibility of any of the parts jamming by virtue of this dual arrangement is precluded.

Although various arrangements whereby the above specified broad object may be attained are conceivable, we contemplate so arranging the various operating parts that rotation of the starting motor in one direction will function to crank the engine, while rotation in the other will function to apply the brakes.

Still another object of the invention is to so couple the shaft of the electric starting motor with the brake operating mechanism that, when the shaft is rotating in brake applying direction, the amount of power transmitted from the rotating shaft to the brakes may be controlled at the option of the vehicle driver.

A further object of the invention is to so arrange this coupling between the rotating shaft of the electric motor and the brake applying mechanism that regardless of the frictional resistance from the brakes, there will always be sufficient slippage to prevent the stalling of the electric motor shaft. Otherwise, when the brakes were applied with great force a predetermined maximum resistance offered thereby would result in preventing rotation of the electric motor shaft and thereby injuring the electric motor.

Another meritorious feature involved in the invention resides in the fact that we provide means whereby the brakes may be applied manually through the same control member which operates the electric motor servo mechanism and so arrange the couplings that the manual operation is available at all times, regardless of whether the electric motor is functioning or not.

Still another feature of merit in the improved construction resides in the fact that we provide for moving the starting pinion of the electric motor into engagement with the fly wheel ring gear manually prior to closing the circuit through said starting motor to crank the engine. In this way we avoid the danger of breaking the starting pinion by reason of its failure to mesh properly with the fly wheel ring gear as it slides outward for that purpose upon rotation of the starting motor. The motor is not started until the pinion and ring gear are in contact with one another. If they are in a position to mesh properly without rotation of the pinion, the two will immediately slide into mesh. If not, the starting pinion will abut the fly wheel ring gear by virtue of the manual pressure applied to the starter pedal and upon subsequently automatically closing the circuit through the starting motor, the first movement of rotation combined with the constant pressure tending to mesh the two will result in the pinion slipping easily into engagement with the ring gear.

An additional feature of importance resides in the provision of means whereby movement of the manual brake applying means operates to create a predetermined frictional coupling between the booster brake operating mechanism and the brake shaft. This constitutes a complete safeguard against stalling the motor on application of the brakes, and means are included whereby the maximum power transmitted by the frictional coupling without slippage may be adjusted.

Fig. 1 is a somewhat diagrammatic illustration of our entire combination,

Fig. 2 is a side elevation, partly in section taken on the line 2—2 of Fig. 3,

Fig. 7 is an enlarged elevation partly in section of the booster mechanism including means for adjusting the maximum expansion of the clutch spring, and Fig. 8 is a similar view of a somewhat modified structure.

Figure 5:
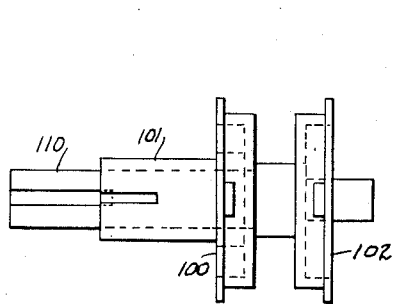
Fig. 5 is a detail view of the flanged collar which engages the expanding clutch spring.
Figure 4:
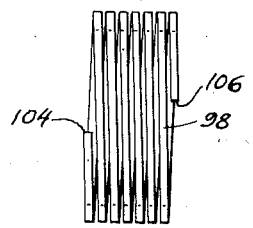
Fig. 4 is a front elevation of the expanding clutch spring.

In the diagrammatic illustration of Fig. 1, numeral 10 represents an internal combustion engine. The electric starting motor 12 is provided with an electric switch 14, secured in any convenient manner and preferably to a bracket 16 on the electric motor. Depression of the starter pedal 18 is adapted to move the switch plunger 20 during the latter part of its movement.

The brake pedal 22 is connected through the linkage 24 and 26 to an arm 28 which is secured to the rotatable brake shaft 30. Each end of the brake shaft 30 is provided with an arm 32, to each extremity of which is pivoted a brake rod 34. Each of these brake rods is in turn coupled to an arm 36 which operates the brake shoes within the drum 38 of each wheel.

Operation of the electric motor 12 in one direction is adapted to crank the engine 10 through engagement with the ring gear 39 of its fly wheel in housing 40 in a manner to be hereafter described.

The brake pedal 22 operates in a manner to be hereafter described to couple the electric motor with a booster mechanism 42 for the purpose of increasing the power transmitted to each of the brakes.

Referring to Fig. 2, it will be noted that the armature shaft 52 is mounted in the bearings 54 and 56 provided in the gear housing 58. Pinion 60 is adapted to be slid on the starting motor shaft 52 by means of the starter pedal 18 into mesh with the ring gear 39 of the engine for the purpose of cranking the same.

Pinion 60 is secured to the shell 62 of an overrunning one-way roller clutch which is adapted to operate with the cam member 64 of the roller clutch by means of a roller 66. Cam member 64 is splined on the shaft 52 as indicated at 68.

Secured to the cam member 64 is a grooved collar 70 which is adapted to cooperate with the forked lower extremity 72 of the starter pedal 18, and also adapted to slide on the hub section of the cam members 64 against the resistance of the spring 74. Thus it will be seen that upon depression of starter pedal 18 the grooved collar 70 will be forced to slide axially along the motor shaft 52. This will tend to force the pinion 60 into engagement with the ring gear 39 through the medium of the coil spring 74. Should the pinion and ring gear not be in a position to slide into mesh immediately, the coil spring 74 will yield when the pinion and gear abut one another.

The plunger 20 of electric switch 14, the starter pedal 18, and the collar 70 are arranged in such relation to one another that plunger 20 will not be actuated to close a circuit through the motor 12 until the pinion 60 and the ring gear 39 are in mesh, or at least until the collar 70 has moved axially a distance normally sufficient for that purpose and they have abutted one another, forcing the spring 74 to yield. In this way possible breakage or shattering of the pinion 60 when striking ring gear 39 during rapid rotation is avoided. After the engine is started the shell 62 overruns the cam member 64 until the pedal 18 is released and returns to its normal position under the influence of the retraction spring 76.

Secured to the gear housing 58 is a second housing 78 for the purpose of enclosing our booster mechanism now to be described. A second shaft 80 is splined to shaft 52 as indicated at 82. A bearing 84 is provided on one end of housing 78 for the outer extremity of shaft 80. An overrunning clutch 86 is provided on shaft 80 which operates in a manner similar to that on shaft 52, except that its overrunning is permitted in a reverse direction. This overrunning clutch has an inner shell member 87 keyed to shaft 80 and an outer camming shell 88 to which is splined a worm 90. A worm wheel 92 has its bearings in hubs 94 and 96 of the booster housing 78.

For the purpose of transmitting energy from the rotating worm wheel 92 to the brake shaft 30, a coil spring clutch is utilized. This clutch comprises a rectangular wire coil spring 98 which is normally free within the bore of worm wheel 92 but which may expand to fit the bore tightly upon relative rotative movement of flanged members 100 and 102 which are designed to bear against opposite extremities 104 and 106 respectively of the coil spring 96.

Figure 3:
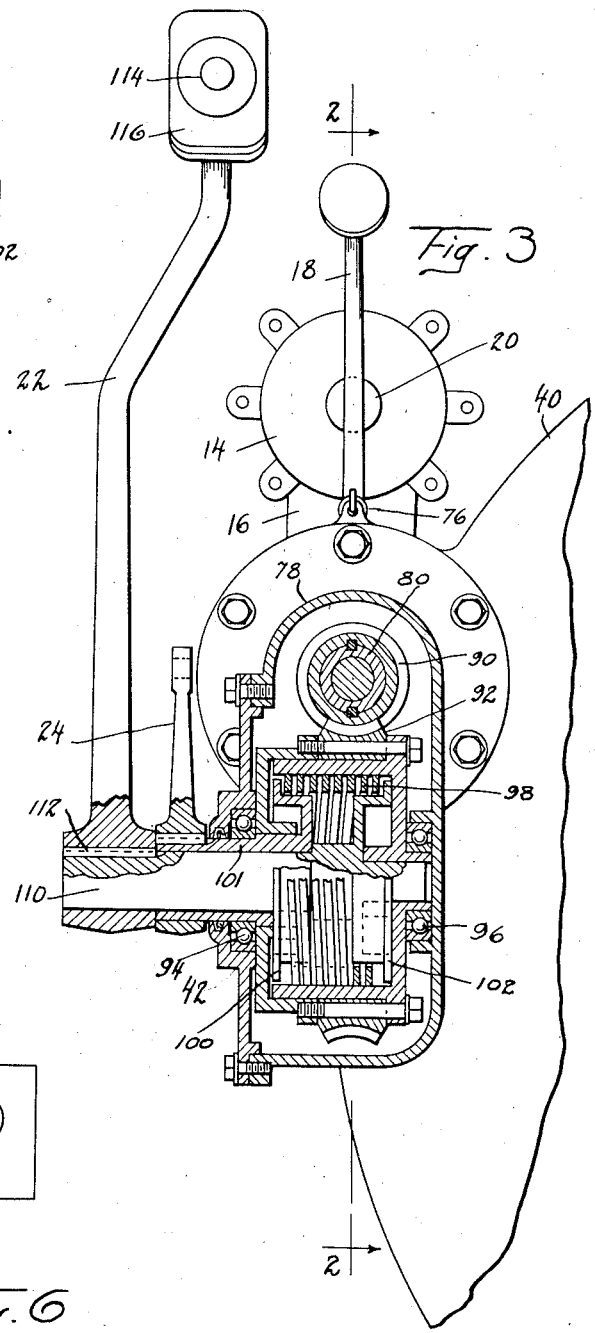
Fig. 3 is a front elevation, partly in section taken on the line 3—3 of Fig. 2.
Figure 6:
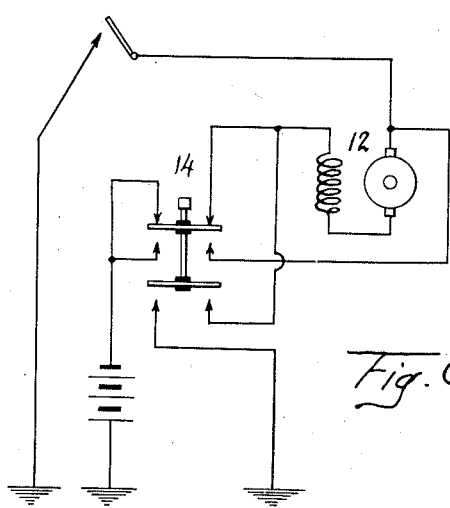
Fig. 6 is a circuit diagram.

Brake operating arm 24 is keyed to the hub 101 of flanged member 100, as clearly illustrated in Fig. 3, and brake pedal 22 is secured to the shaft portion 110 of flanged member 102, as by the key 112.

The brake pedal 22 has an electric switch 114 built into the treadle plate 116. Upon initial depression of the brake pedal the switch 114 functions to close an electric circuit through the motor 12 in a direction opposite to the circuit closed by switch 14. In this direction of rotation the overrunning one-way clutch 86 operates to rotate the worm 90 and consequently the worm wheel 92. Subsequent depression of the brake pedal 22 functions to expand the coil spring 98 within the bore of the worm wheel and this frictional engagement between spring and worm wheel transmits power from rotating worm wheel 92 through the spring to the flange member 100 to thereby rotate the arm 24. It will be noted that the worm wheel 92 is rotated in the direction of the arrow (see Fig. 2) and reaction pressure is thereby continuously exerted on the worm 90 to maintain the overrunning clutch 86 in its operative position.

A coil spring 118 is interposed between the worm 90 and bearing 56. This is for the purpose of permitting the worm 90 to slide axially along shaft 80, without being rotated, as the brakes are applied mechanically by depression of pedal 22 to actuate arm 24 through spring 98 if the electric motor is not functioning.

From the foregoing description it is apparent that overrunning clutch 62 will become operative upon depression of starter pedal 18 to force the pinion 60 to rotate with the electric motor shaft after the switch 14 has been closed. During this operation the overrunning clutch 86 permits the shaft 80 to remain stationary. On the other hand depression of the brake pedal 22 and closing of switch 114 to rotate the motor in a reverse direction causes overrunning clutch 86 to become operative to rotate the shaft 80 and its worm 90, while the shell of overrunning clutch 62 to which the pinion 60 is secured is permitted to remain idle. In this way the electric motor 12 performs two distinct and independent functions depending entirely upon its direction of rotation.

Due to the fact that expansion of the spring coil clutch 98 might provide too powerful a frictional engagement between the said spring and the worm wheel 92 and thus cause the electric motor 12 to stall when resistance of the brakes became too great, means have been provided whereby the power of this frictional engagement may be adjusted to a predetermined maximum. While we have not included this adjusting means in Fig. 2 because of the fact that the drawings would become too confused, we have clearly illustrated it in conjunction with the mechanism of Fig. 2 in Figs. 7 and 8. It is obvious from the drawings and description that as the brake pedal 22 is depressed and the spring 98 expands, the angle "A" (See Fig. 7) will be increased. For the purpose of limiting this angle to a predetermined maximum, and thus limiting the frictional engagement between the spring and worm wheel, we have provided a spring connection between the brake pedal 22 and the arm 108. This spring connection consists simply of an internally threaded bracket 120 secured to pedal 22 into which is threaded a screw 122. A coil spring 124 has its ends secured respectively to the arm 108 and the extremity of screw 122. By the simple expedient of turning the screw 122, the spring 124 may be so adjusted that the angle "A" will equal a predetermined value when the spring 124 is drawn to its maximum tension.

In this way the maximum friction between the coil spring clutch 98 and the worm wheel 92 is regulated, and as a consequence thereof the maximum power which may be transmitted from the electric motor 12 to the brakes through this friction coupling is regulated.

It is obvious that, once this maximum has been attained, any further braking power will be exerted manually by the brake pedal 22 operating mechanically through the spring 98 to the arm 108.

The modified adjustment structure illustrated in Fig. 8 differs from that already described only in that an additional differential adjusting means is provided between the brake pedal 126 and the brake linkage lever 128. A quadrant plate 130 is substituted for the flanged member 100. This plate is provided with a plurality of spaced apart apertures 132 about its periphery adapted to aline with similarly spaced apertures in the arc of spring 98. By simply bolting any two alined apertures, the relative position of spring 98 and brake operating lever 128 may be adjusted so that maximum gripping power of the frictional clutch may be attained upon any desired depression of the brake pedal. The remaining stroke of pedal depression will, as already explained, manually apply the brakes.

Having illustrated a preferred embodiment of our invention, various modifications will be apparent, and we intend to limit ourselves only within the scope of the appended claims.

We claim:

1. Automotive mechanism comprising, in combination, a starting motor including a rotatable armature shaft held against axial movement, an internal combustion engine, brakes, and means for selectively forming operative connections between the motor and either the engine or the brakes, said motor and brake connection forming means including adjustable means for limiting the power transmitted thereby to a predetermined maximum.

2. Automotive mechanism comprising, in combination, an internal combustion engine, a motor, a pinion slidable axially along the shaft of said motor and rotatable therewith, brake operating mechanism, a starter pedal, a brake pedal, means whereby initial movement of said starter pedal slides said pinion to engage the fly wheel ring gear of said combustion engine and subsequent depression thereof closes a circuit through said motor, means responsive to depression of said brake pedal to close a reverse circuit through said motor, and a one-way connection between said brake operating mechanism and motor shaft operable only on rotation thereof in the reverse direction.

3. An automotive mechanism comprising, in combination, an internal combustion engine, a motor including a rotatable armature shaft held against axial movement, brakes, means to connect the motor to the engine to start the same, means to connect the motor to the brakes to operate the same, said means including means whereby the motor may continue to rotate when an over capacity load resistance is offered by said brakes.

4. Automotive mechanism comprising an internal combustion engine, a reversible electric motor, a starter pedal, a brake pedal, brakes, means whereby initial depression of said starter pedal forms an operative connection between said motor and said engine, means whereby subsequent depression thereof closes a circuit through said motor in one direction to crank the engine, means whereby initial depression of said brake pedal closes a circuit through said motor in a reverse direction, and means whereby subsequent depression of said brake pedal forms an operative connection between said motor and brakes.

5. In combination with automotive mechanism including a reversible electric motor and an internal combustion engine, means for coupling the shaft of said motor with said engine to crank the same and subsequently transmitting power for that purpose, brakes, a rotatable brake shaft operatively connected therewith, and a one-way connection between the shaft of said motor and said brake shaft whereby rotation of the former in a reverse direction applies the brakes.

6. In combination with a booster brake mechanism operable through a friction clutch coupling including a manually movable element, means for adjustably limiting the movement of said element to transmit a predetermined maximum of power.

7. In combination with a booster brake mechanism operable through a friction clutch coupling including a manually movable element, means for adjusting the clutch to transmit a predetermined maximum of power, and means whereby the brakes may be further applied manually upon reaching said maximum.

8. Automotive mechanism comprising an internal combustion engine, a motor, brakes, a brake operating member, a starter pedal, means automatically operable on actuation of the brake operating member to couple the motor with the brakes and engage the motor, and means operable successively by the starter pedal to first couple the motor with the engine and subsequently energize the motor.

In testimony whereof, we, VINCENT G. APPLE and FREDERICK W. COTTERMAN, sign this specification.

VINCENT G. APPLE.
  FREDERICK W. COTTERMAN.